United States Patent Office 3,414,610
Patented Dec. 3, 1968

3,414,610
PRODUCTION OF ADDITION COMPOUNDS CONTAINING FORMIC ACID
Kuno Wagner and Hans Holtschmidt, Leverkusen, Germany, assignors to Farbenfabriken Bayer Aktiengesellschaft, Leverkusen, Germany, a German corporation
No Drawing. Filed Feb. 18, 1965, Ser. No. 434,177
Claims priority, application Germany, Mar. 14, 1964, F 42,315
9 Claims. (Cl. 260—501.11)

ABSTRACT OF THE DISCLOSURE

Production of addition compounds of tertiary organic base and formic acid of the type $R_2N \cdot (HCOOH)_n$ in which the 3 radicals R may be the same or different and in which 2 of such radicals R may form a heterocyclic ring system with the N atom, $n$ being 2–8, by reacting at least 2 mols of formic acid per mol of the corresponding tertiary organic base at about 10–150° C. and then subjecting the resulting product to reduced pressure distillation whereby to convert the product to such addition compound form.

---

This invention relates to novel addition compounds produced from formic acid and tertiary organic bases and to a method for preparing these addition compounds.

It has been found that tertiary organic bases and formic acid react together under suitable conditions to form addition compounds, provided that specific concentration ratios are maintained beyond the salt formation stage. The most stable of the new addition compounds contain one molecule of tertiary organic base and three molecules of formic acid.

The existence of the new compounds must be regarded as surprising because, as formic acid is known to form salts with organic bases, it could not be assumed that materials obtained from for example, 1 mol of trimethyl amine and 3 mols of formic acid would be stable and capable of being distilled and purified.

The process according to the invention for the production of addition compounds containing formic acid may be carried out by reacting 1 mol of a tertiary organic base with at least 2 mols of highly concentrated formic acid for example at 10 to 150° C. In a preferred embodiment of the process, more than 2 mols and preferably from 4 to 8 mols of formic acid are used, and the base is allowed to act as such or in the nascent state on a large excess of formic acid or nascent formic acid. The reaction mixture is then distilled, water and any impurities are removed, together with the excess formic acid and, finally, the adducts are distilled at reduced pressure. These new addition compounds of formic acid are almost odourless compounds which are liquid at room temperature and often have definite boiling points. For example, the addition product of 2 molecules of formic acid and 1 molecule of trimethyl ammonium formate boils at a temperature of 87° C./15 mm. Hg and is a readily mobile and almost odourless liquid. The addition products of dimethyl ethylamine, monomethyl diethylamine and triethylamine boil at temperatures ranging from 93 to 98° C./15 mm. Hg. Investigation by infrared spectroscopy has shown that these adducts have very strong hydrogen bonds between the formic acid salts and the two added molecules of formic acid. Results of chemical tests have shown that there is at least one molecule of highly activated formic acid in these adducts.

The new addition compounds containing formic acid correspond to the general formula:

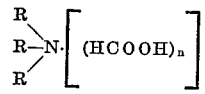

in which each R represents an optionally substituted aliphatic, aromatic, cycloaliphatic or heterocyclic radical, or the radical of an aliphatic tertiary amine or polyamine, or two or three radicals may be combined with the nitrogen atom to form a ring, and $n$ represents a number from 2 to 8.

As may be appreciated from the instant disclosure, the process is particularly directed to the preparation of 1:3 addition compounds of a tertiary organic base and formic acid having the formula

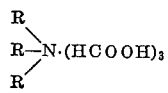

in which each R independently is alkyl having 1 to 2 carbon atoms, the process comprising the reaction of at least 2 mols of concentrated formic acid per mol of a tertiary organic base of the formula

in which each R respectively is the same as defined above, at a temperature of about 10 to 150° C., and subjecting the resulting product to reduced pressure distillation to convert such product to the corresponding 1:3 addition compound.

The following modifications of the process according to the invention may be used for the production of addition compounds of formic acid and tertiary organic bases:

(Ia) Trimethylamine, for example, is introduced into excess anhydrous or aqueous industrial formic acid, preferably in the presence of small quantities of an inert gas (e.g. $N_2$). Excess formic acid and water are removed by distillation at reduced pressure, so that a high yield of an addition product of 1 molecule of trimethylamine and 3 molecules of formic acid is finally obtained as a constant boiling fraction. B.P. 87° C./15 mm. In view of the difficulties involved in the removal of water and formic acid by distillation, it is remarkable that water can be quantitatively removed in this form of the process, which is an indication of the stability of the new addition compounds. The addition products of methyl diethylamine, dimethyl, ethylamine and triethylamine may be prepared by the same process. These addition compounds, too, have definite compositions comprising 3 molecules of formic acid and 1 molecule of the tertiary organic base. All tertiary organic bases, including a variety of heterocyclic bases, also form liquid addition compounds with 2 to 8 molecules of formic acid beyond the salt formation stage.

Examples of these addition compounds are the following addition products from 2 to 8 mols of formic acid and 1 mol of the following bases:

i. Aliphatically substituted tertiary amines and polyamines, such as diethyl-n-propylamine, dimethyl propylamine, dimethyl butylamine, N-methyl dibutyl amine, tri-n-butylamine, dimethyl stearylamine, permethylated ethylene diamine, permethylated diethylene triamine and triethylene tetramine, permethylated polyethylene imines and permethylated aliphatic amines and polyamines containing ester groups, ether groups and nitrile groups.

ii. Aliphatic-cycloaliphatically substituted amines and polyamines such as dimethyl cyclohexylamine, diethyl cyclohexylamine, permethylated and hydrated p-phenylene diamine.

iii. Araliphatically substituted amines, such as dimethyl benzylamine, diethyl benzylamine, di-n-propyl benzyl amine.

iv. Heterocyclic bases, such as pyridine, quinoline, N-methyl morpholine, N-methyl piperidine, N,N'-dimethyl piperazine, endoethylene piperazine and bicyclic amidines of the type obtained, for example, by the addition of acrylonitrile and pyrrolidone, followed by hydration and cyclisation.

(Ib) Aqueous solutions of the bases are used, for example trimethylamine solutions of any origin, or solutions of salts of trimethylamine with carbonic acid or solutions of tertiary amines obtained by Reppe's method from amines, carbonyl compounds, carbon monoxide and water. The aqueous solutions are mixed with excess formic acid and about 8 mols of formic acid are used per mol of tertiary base. Water, $CO_2$ and other impurities are removed at reduced pressure. The residue contains the addition products according to the invention in the form of difficultly boiling components which are if desired fractionally-distilled.

(Ic) Nascent formic acid is used in the preparation of the addition products. In this reaction, for example, carbon monoxide is allowed directly to act on water at 200 atmospheres pressure in the presence of catalysts and tertiary bases, or oxalic acid is used as the agent that reacts to form formic acid.

(IIa) Tertiary bases are used in the nascent state, for example, nascent trimethylamine, and the Leuckart-Wallach reaction is carried out in an improved form with a number of compounds (see table) in the presence of excess aldehydes, for example formaldehyde, paraformaldehyde or fairly high molecular weight polyoxymethylenes and excess formic acid. The resulting mixture is not worked up in accordance with the general practice of the Leuckart-Wallach reaction which comprises fixing the amine with a concentrated acid, such as hydrochloric acid, and distilling off the excess formic acid and formaldehyde, but is distilled at reduced pressure. Distillation is completed in the presence of excess formic acid, and the new addition compounds which are contained in the residue may be converted into the pure products by distillation at reduced pressures, as long as they are stable. In this modification of the process, the following compounds, for example, may be methylated with formaldehyde by the Leuckart-Wallach method, in which case the addition compound containing active formic acid from 1 molecule of trimethyl amine and 3 molecules of formic acid is always obtained in a high yield: monomethyl amine, dimethylamine, ammonia, ammonium carbonate, ammonium carbamate, ammonium formate and ammonium salts of other organic carboxylic acids, formamide, acetamide, methylformamide, methylene-bis-formamide, symmetrical trimethyl hexahydrotriazine and hexamethylene tetramine. It has been found that the addition compound of hexamethylene tetramine is formed in a particularly high yield by reacting the hexamethylene tetramine with formic acid in the presence of another 3 to 6 mols of formaldehyde and heating the reacting mixtures until the escaping gases contain only about 3% of $CO_2$ and about 97% of CO. In this process, fresh formic acid is fed into the reaction mixture in proportion as $CO_2$ and CO are formed. A variety of mono- and dialkylated bases or secondary heterocyclic bases may be similarly methylated with formaldehyde and formic acid and converted into the addition compound by reaction with formic acid.

By virtue of the high reactivity of formic acid, the new addition compounds may be used to advantage in all the known reactions which can be carried out with formic acid and of which the following are accelerated: N- and O-formylations, mixed anhydride formation from formic acid and other mono- and polycarboxylic acids, introduction of the —CH groupings in the synthesis of heterocyclic compounds, isocyanate polyaddition reactions and polymerisation reactions. In addition, all these adducts or their mixtures with excess formic acid are valuable solvents for sparingly soluble organic compounds. If desired, they may be used to prepare pure carbon monoxide because they decompose at temperatures from 130 to 200° C., depending on their composition, in accordance with the equation:

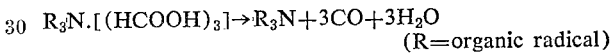
(R=organic radical)

This invention may be illustrated by the following examples, which are not to be regarded as limitative.

EXAMPLE 1

A gas stream of 1350 parts by weight trimethyl amine diluted with 10% by weight of nitrogen is introduced into 7,000 parts by weight of thoroughly stirred industrial formic acid (90% by weight of HCOOH) at 20 to 40° C. On completion of the introduction of the trimethylamine, the product is distilled in vacuo through a column, while any excess formic acid, water and small amounts of trimethylamine are removed by water jet vacuum. Finally, 5190 parts by weight of a fraction boiling at 87° C./15 mm. are obtained which, as shown by analysis and the infra-red spectrum, has the composition of an addition compound of 3 molecules of formic acid and 1 molecule of trimethyl amine, i.e.

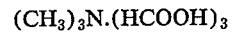

Yield: 95% theoretical, based on the amount of trimethyl amine used.

EXAMPLE 2

2 mols of each of the compounds listed in the table are subjected in the following manner to a modified Leuckart-Wallach methylation: the compounds to be methylated are dissolved or mixed in an eightfold excess of formic acid over the amount required for the preparation of the trimethylamine. Paraformaldehyde containing, for example, 2% by weight of water is added until there is an excess amount of 0.8 mol of formaldehyde for each methyl group to be introduced. The aminomethylation is then carried out at a temperature from 100 to 120° C., the temperature being raised to 140° C. after six hours. Fresh formic acid is added to the reaction mixture in proportion as $CO_2$ and, subsequently, carbon monoxide escapes from it, the reaction being controlled by means of a gas meter. The reaction mixture is boiled under reflux while stirring until the $CO_2$ content of the escaping gas has fallen to about 3% and the carbon monoxide content has reached about 96%. The reaction mixtures are then worked up as described in Example 1. In this process, the addition product of 3 molecules of formic acid with 1 molecule of trimethylamine, B.P. 87° C./15 mm. is obtained in the yields shown in the following table:

ethylene diamine and diethylene triamine. In each instance 1 mol of the amine or polyamine is added while cooling to 5 mols of 90% by weight formic acid, whereafter 2.2 mols of 35% by weight formaldehyde solution

TABLE

| No. | Starting Material | Reaction product | Yield based on amine used in percent by weight |
|---|---|---|---|
| 1 | $NH_3$ | $(CH_3)_3N \cdot 3HO \cdot CHO$ | 82 |
| 2 | $NH_4 \cdot O \cdot CHO$ | $(CH_3)_3N \cdot 3HO \cdot CHO$ | 88 |
| 3 | $NH_4 \cdot O \cdot CO \cdot NH_2$ | $(CH_3)_3N \cdot 3HO \cdot CHO$ | 87 |
| 4 | $H_2N \cdot CHO$ | $(CH_3)_3N \cdot 3HO \cdot CHO$ | 85 |
| 5 | hexamethylenetetramine-like cyclic structure with CH₃–N and N–CH₃ groups | $(CH_3)_3N \cdot 3HO \cdot CHO$ | 76 |
| 6 | Hexamethylene tetramine | $(CH_3)_3N \cdot 3HO \cdot CHO$ | 94 |
| 7 | $CH_3 \cdot NH \cdot CHO$ | $(CH_3)_3N \cdot 3HO \cdot CHO$ | 72 |
| 8 | Tetramethyl urea | $(CH_3)_3N \cdot 3HO \cdot CHO$ | 80 |
| 9 | $(CH_3)_2N-CH_2-N(CH_3)_2$ | $(CH_3)_3N \cdot 3HO \cdot CHO$ | 86 |
| 10 | $OHC \cdot NH \cdot CH_2 \cdot NH \cdot CHO$ | $(CH_3)_3N \cdot 3HO \cdot CHO$ | 81 |
| 11 | $HOCH_2 \cdot HN \cdot CHO$ | $(CH_3)_3N \cdot 3HO \cdot CHO$ | 85 |

EXAMPLE 3

The procedure is as in Example 1, except that the trimethylamine is replaced by triethylamine and 101 parts by weight of the base are introduced dropwise with stirring at 20 to 40° C. into 150 parts by weight of 98% by weight of the base are introduced dropwise with stirscribed in Example 1, and the yield is 200 parts by weight of a constant-boiling adduct of 3 molecules of formic acid and 1 molecule of triethylamine, i.e.

$(C_2H_5)_3N \cdot (CHCOOH)_3$

B.P. 98° C./18 mm.

EXAMPLE 4

In accordance with Example 2, the Leuckart-Wallach methylation is carried out using in turn ethylamine, diethyl amine, methyl ethylamine, di-n-propylamine, cyclohexylamine, butylamine, piperidine, morpholine, benzyl amine, are added. The mixtures are heated in a reflux condenser on a steam bath, and, after a short time, a vigorous evolution of carbon dioxide begins. The supply of heat is cut off until the evolution of gas has subsided a little, whereafter the mixtures are heated for a further 10 hours. At the end of this time, water and formic acid are removed by distillation in a water jet vacuum, 5 mols of formic acid being added to the reaction mixture during distillation per mol of the teritary amine formed. After the water and excess formic acid have been removed, fractions containing compounds of 3 molecules of formic acid and 1 molecule of tertiary base, B.P. 92–99° C./18 mm. are obtained from dimethyl ethylamine and diethyl methylamine. The liquid addition products of the other tertiary organic bases referred to decomposed when tested for purity by distillation, and liquid 1:1 salts, 2:1 adducts, CO, $H_2O$ and small amounts of $CO_2$ and hydrogen are obtained.

What we claim is:

1. An addition compound of a tertiary organic base and formic acid having the formula

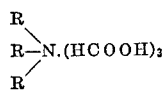

in which each R independently is alkyl having 1 to 2 carbon atoms.

2. $(CH_3)_3N.(HCOOH)_3$
3. $(C_2H_5)_3N.(HCOOH)_3$

4. Process for preparing 1:3 addition compound of tertiary organic base and formic acid having the formula

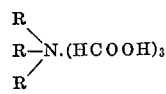

in which each R independently is alkyl having 1 to 2 carbon atoms, which comprises reacting at least 2 mols of concentrated formic acid per mol of a tertiary organic base having the formula

in which each R respectively is the same as defined above, at a temperature between about 10–150° C., and subjecting the resulting product to reduced pressure distillation whereby to convert such product to the corresponding 1:3 addition compound.

5. Process according to claim 4 wherein said tertiary organic base is trimethylamine.

6. Process according to claim 4 wherein said tertiary organic base is triethylamine.

7. Process according to claim 4 wherein any excess formic acid and water is removed by normal distillation prior to such reduced pressure distillation.

8. Process according to claim 4 wherein the formic acid is used in highly concentrated form of at least 90% by weight HCOOH.

9. Process according to claim 4 wherein said tertiary organic base and said formic acid are both used in nascent state.

References Cited

UNITED STATES PATENTS 2,519,924  8/1950  Nowak.
2,842,546  7/1958  Lane.
2,357,412  9/1944  Levesque _____ 260—501

OTHER REFERENCES

Pushin et al.: C.A., vol. 42, column 2167(a), 1948.
Lakshmanen: C.A., vol. 49, column 2871(e), 1955.
Smith: J. Chem. Phys., 62(1), 125–31, January 1964.

LEON ZITVER, *Primary Examiner.*

M. W. GLYNN, *Assistant Examiner.*

UNITED STATES PATENT OFFICE
CERTIFICATE OF CORRECTION

Patent No. 3,414,610                          December 3, 1968

Kuno Wagner et al.

It is certified that error appears in the above identified patent and that said Letters Patent are hereby corrected as shown below:

Column 1, line 16, "$R_2N.(HCOOH)_n$" should read -- $R_3N.(HCOOH)$ --. Column 5, line 63, "of the base are introduced dropwise with stir-" should read -- formic acid. The mixture is worked up as de- --; line 67, the formula should appear as shown below:

$$(C_2H_5)_3N.(HCOOH)_3,$$

Column 8, line 25, "62(1)" should read -- 61(1) --.

Signed and sealed this 17th day of March 1970.

(SEAL)
Attest:

EDWARD M. FLETCHER, JR.                    WILLIAM E. SCHUYLER, JR.
Attesting Officer                              Commissioner of Patents